(12) United States Patent
Berthold et al.

(10) Patent No.: US 12,176,772 B2
(45) Date of Patent: Dec. 24, 2024

(54) IMPREGNATION DEVICE FOR TRICKLE IMPREGNATION OF A STATOR OF AN ELECTRIC MACHINE

(71) Applicant: Gehring Technologies GmbH + Co. KG, Ostfildern (DE)

(72) Inventors: Jens Berthold, Hoym (DE); Richard A. Rasp, Usingen (DE)

(73) Assignee: Gehring Technologies GmbH + Co. KG, Ostfildern (DE)

( * ) Notice: Subject to any disclaimer, the term of this patent is extended or adjusted under 35 U.S.C. 154(b) by 648 days.

(21) Appl. No.: 17/599,230

(22) PCT Filed: Mar. 5, 2020

(86) PCT No.: PCT/EP2020/055873
§ 371 (c)(1),
(2) Date: Sep. 28, 2021

(87) PCT Pub. No.: WO2020/193098
PCT Pub. Date: Oct. 1, 2020

(65) Prior Publication Data
US 2022/0181956 A1 Jun. 9, 2022

(30) Foreign Application Priority Data

Mar. 28, 2019 (DE) .................... 10 2019 002 234.3

(51) Int. Cl.
*B29C 39/10* (2006.01)
*B05B 13/02* (2006.01)
(Continued)

(52) U.S. Cl.
CPC ......... *H02K 15/12* (2013.01); *B05B 13/0228* (2013.01); *B05C 5/0241* (2013.01);
(Continued)

(58) Field of Classification Search
CPC .. H02K 15/12; B05B 13/0228; B05C 5/0241; B05C 9/14; B05C 13/02
(Continued)

(56) References Cited

U.S. PATENT DOCUMENTS

2011/0061228 A1  3/2011  Umino et al.
2018/0331602 A1  11/2018  Donolo
(Continued)

FOREIGN PATENT DOCUMENTS

CN  101107767 A  1/2008
CN  102037635 A  4/2011
(Continued)

OTHER PUBLICATIONS

International Search Report, PCT/EP2020/055873, mailing date of search report, May 28, 2020.
(Continued)

*Primary Examiner* — Jeffrey M Wollschlager
*Assistant Examiner* — Xue H Liu
(74) *Attorney, Agent, or Firm* — BOND, SCHOENECK & KING, PLLC; George R. McGuire

(57) ABSTRACT

The invention relates to an impregnation device for trickle impregnation of a stator of an electric machine with a synthetic resin which cures under an increase in temperature, the stator having a hollow cylindrical stator core and at least one winding, a drive shaft being arranged coaxially inside the stator and being drivable by a drive motor, at least one holding device being arranged on the drive shaft, by means of which holding device the stator can be detachably connected to the drive shaft.

7 Claims, 1 Drawing Sheet

(51) Int. Cl.
*B05C 5/02* (2006.01)
*B05C 9/14* (2006.01)
*B05C 13/02* (2006.01)
*B29C 39/44* (2006.01)
*H02K 15/12* (2006.01)
*B29L 31/00* (2006.01)

(52) U.S. Cl.
CPC ............... *B05C 9/14* (2013.01); *B05C 13/02* (2013.01); *B29C 39/10* (2013.01); *B29C 39/44* (2013.01); *B29L 2031/749* (2013.01)

(58) Field of Classification Search
USPC ........................................... 425/67
See application file for complete search history.

(56) References Cited

U.S. PATENT DOCUMENTS

| | | |
|---|---|---|
| 2018/0346305 A1 | 12/2018 | Procyshyn et al. |
| 2020/0059142 A1 | 2/2020 | Berthold et al. |

FOREIGN PATENT DOCUMENTS

| | | |
|---|---|---|
| CN | 107070142 A | 8/2017 |
| DE | 1212204 A | 3/1966 |
| DE | 1919642 A | 11/1970 |
| DE | 3631980 A1 | 3/1988 |
| DE | 4334959 A1 | 4/1994 |
| DE | 102017001939 A1 | 8/2018 |
| DE | 202017007015 U1 | 3/2019 |
| DE | 102020126552 A1 | 4/2022 |
| DE | 102020128519 A1 | 5/2022 |
| JP | 2000287418 A | 10/2000 |
| JP | 2006187059 A | 7/2006 |
| JP | 2012005283 A | 1/2012 |
| JP | 2018117462 A | 7/2018 |

OTHER PUBLICATIONS

International Preliminary Report on Patentatibility, Jun. 22, 2021, pp. 1-12.
German Examination Report, Jan. 30, 2020, pp. 1-6.
Translated Chinese Office Action, App. No. 202080024011.7, dated Aug. 6, 2024, entire document.
Translated EP Search Report, App. No. 24154800, dated Jul. 9, 2024, entire document.

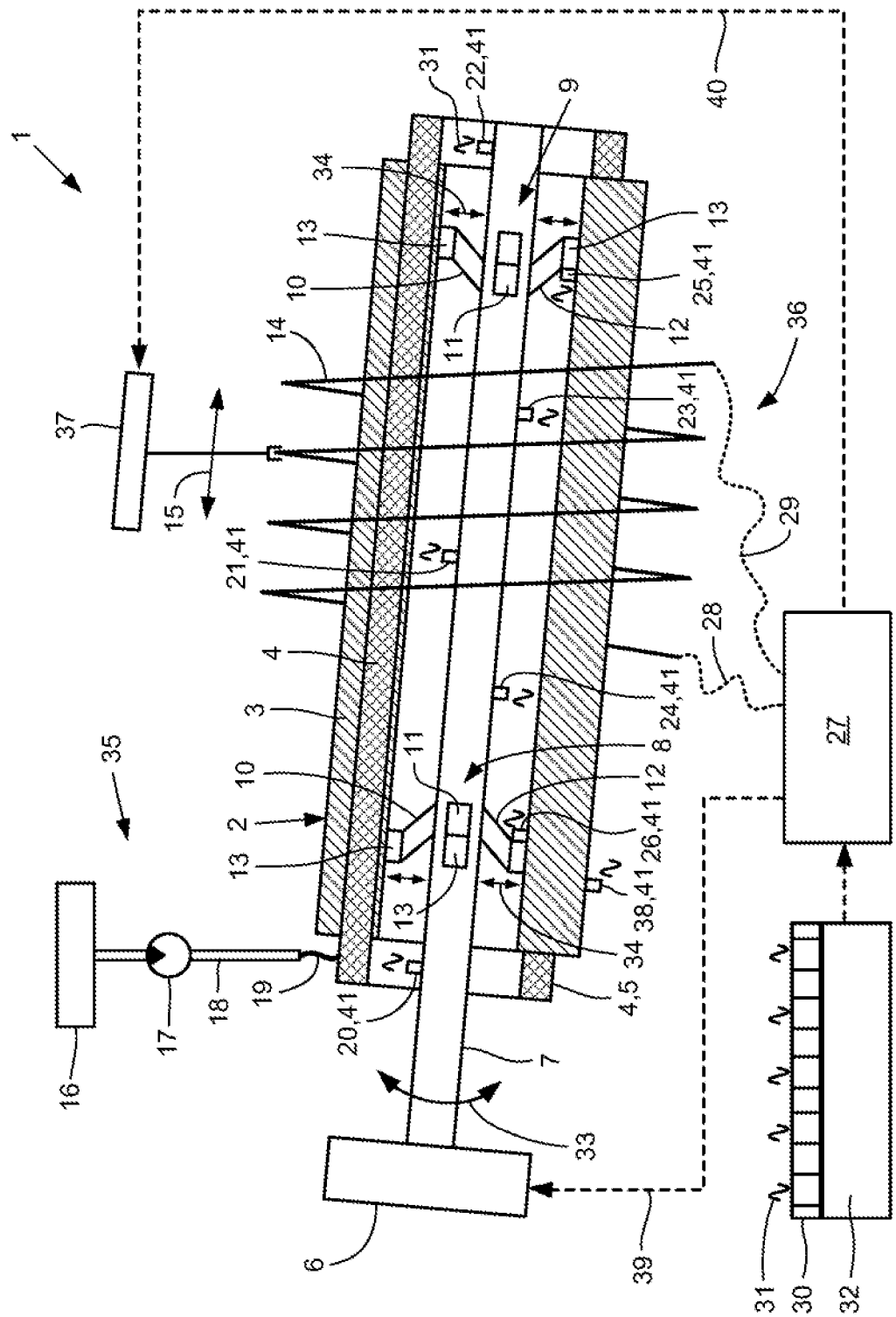

IMPREGNATION DEVICE FOR TRICKLE IMPREGNATION OF A STATOR OF AN ELECTRIC MACHINE

CROSS REFERENCE TO RELATED APPLICATIONS

This is a National Stage Application filed under 35 U.S.C. 371 based on International Patent Application No. PCT/EP2020/055873, filed on Mar. 5, 2020, which claims priority to German Patent Application 10 2019 002 234.3 filed Mar. 28, 2019. The entire disclosures of each of the foregoing are hereby incorporated herein by reference in their entireties.

The invention relates to an impregnation device for trickle impregnation of a stator of an electric machine with a synthetic resin which cures under an increase in temperature, the stator having a hollow cylindrical stator core and at least one winding, a drive shaft being arranged coaxially inside the stator and being drivable by a drive motor, at least one holding device being arranged on the drive shaft, by means of which holding device the stator can be detachably connected to the drive shaft, wherein a trickle device is provided, by means of which the synthetic resin can be directed onto at least one axial end of the winding of the stator, wherein a heating device is provided, by means of which the winding and the stator core can be heated to a predetermined trickle temperature, and the heating device having at least one electromagnetic inductor which is arranged so as to be movable coaxially or axially parallel to the stator.

It is generally known that in the manufacture of an electric machine, be it an electric motor or a generator, there must be a solidification of the winding of the stator and armature. Today this is usually done by means of a so-called trickling process and a related impregnation device. The stator or the armature is heated for this purpose and clamped in the impregnating device preferably obliquely with respect to its longitudinal axis and rotated about this longitudinal axis. However, the stator or armature can also be oriented horizontally. Subsequently, preferably at the higher axial end of the stator or armature, for example at the winding head, a synthetic resin which is initially liquid at room temperature is applied through trickling. The synthetic resin may consist of one or more components, for example a base synthetic resin and a hardener.

The volume flow rate at which the still liquid synthetic resin is applied to the winding of the stator or armature is matched to the particular absorption capacity of said winding. After the trickling, the synthetic resin penetrates into the spaces between the winding wires and the lamination cores and fills these gaps completely. In a subsequent heating of the stator or armature to a curing temperature of the synthetic resin, this solidifies and becomes a thermoset, which renewed heating can no longer deform after this curing step. As a result, the components of the stator or armature which come into contact with the synthetic resin are firmly connected. The thermoset meets all mechanical and electrical requirements that are placed on a stationary or rotating electrical machine.

In order to ensure optimum penetration of the initially liquid synthetic resin into the stator or armature, at least the stator or armature is heated to a so-called trickle temperature prior to the start of the trickling operation and kept at this temperature during the trickling operation. The trickle temperature may be between 70° C. and 90° C., depending on the synthetic resin used, for example. After a predetermined amount of the initially still liquid synthetic resin is introduced into the stator or armature, it is heated above a setting temperature to a curing temperature—also synthetic resin-dependent—for example between 120° C. and 160° C. This curing temperature is then maintained for a predetermined period of time to allow for complete curing of the synthetic resin. Finally, the stator or armature is cooled to room temperature and prepared for further manufacturing operations to produce the electric machine.

The heating of the stator or armature to the trickle temperature and the curing temperature can be carried out in a suitable oven. From DE 1 212 204 A and DE 19 19 642 A, heating of the stator or armature by means of an electrical heating current passed through the windings of the stator or armature is already known. Because simply passing a heating current through the windings can lead to large deviations of the achievable actual temperatures from the desired target temperatures, it has been proposed to ensure the achievement and maintenance of the desired temperatures by controlling the heating current. In this case, the knowledge that in a winding the ohmic resistance increases with increasing temperature was used, so that the temperature of the winding can be deduced from the ohmic resistance. It has therefore been proposed in DE 1 212 204 A that the heating current conducted through the winding of the stator or armature is switched off when the electrical resistance value of the winding required to achieve the trickle temperature or curing temperature has been reached. The heating current is only switched on again when a predetermined lower resistance value of the winding is measured, which is equivalent to falling below a lower limit temperature.

However, the disadvantage of these known methods and the devices used for impregnating a stator or armature of an electric machine is that the temperature control is carried out by means of a heating current passed through the winding, and it is technically complicated to feed this current to the rotating stator or armature. In addition, the methods and devices proposed in the two publications have the defect that the heating current controls are turned off solely based on the temperature of the winding through which the heating current flows. This is unfavorable at least in those periods in which the other components surrounding the windings have not yet assumed the temperature of the windings. However, because the synthetic resin makes contact, not only between adjacent wires or wire portions of the windings, but also with other components of the stator or armature, the temperature there is not precisely known for the synthetic resin. Therefore, at least the heating-up phase must be extended based on experience until the trickle temperature has been reached and it can be assumed that the winding temperature determined by the electrical resistance measurement is also present in all other components of the stator or armature. Only then can the trickling of the synthetic resin begin in the stator or armature with the desired process reliability. Because this uncertainty regarding the temperatures of the components of the stator or armature and the synthetic resin is also present at the beginning of the curing process, this process must also be extended disadvantageously for a safety period. Lastly, it is disadvantageous that the heating of the synthetic resin takes place only indirectly through heat transfer between the windings and the resin. This means that reaching the trickle temperature and the curing temperature takes a comparatively long time.

The described time periods for the impregnation of a stator or armature result in a costly prolongation of the production time and an increase in energy costs for heating up to and maintaining the trickle and curing temperatures.

In DE 10 2017 001 939 A1 from copperING GmbH, a generic impregnation device was proposed in which an electromagnetic inductor is used to heat a stator. This inductor surrounds the stator coaxially and is arranged to be movable to and fro between its two axial ends. By means of the inductor, the stator along with its winding can be heated completely and in a very short time to the predetermined trickle temperature, and this temperature can then also be maintained. The regulation of the activity of the inductor is carried out in this known impregnation device depending on the stator's temperature, which is contactlessly measured by means of a temperature sensor on its radial outer face.

Because the measurement of the temperature of the hollow cylindrical stator on its radial outer face only provides indirect information about the temperature on its radial inner face, the object of the invention was to further develop the impregnation device known from DE 10 2017 001 939 A1 such that with it the temperature which is important for the operational control of the inductor can be measured on the radial inner face of a stator and fed to a related control device. The difficulty arose here that the stator rotates about its longitudinal axis during the trickle impregnation process.

SUMMARY OF THE INVENTION

The solution to this problem is achieved with an impregnation device having the features of claim 1. Advantageous further developments of the impregnation device are defined in the dependent claims.

The invention accordingly relates to an impregnation device for trickle impregnation of a stator of an electric machine with a synthetic resin which cures under an increase in temperature, the stator having a hollow cylindrical stator core and at least one winding, a drive shaft being arranged coaxially inside the stator and being drivable by a drive motor, at least one holding device being arranged on the drive shaft, by means of which holding device the stator can be detachably connected to the drive shaft, wherein a trickle device is provided, by means of which the synthetic resin can be directed onto at least one axial end of the winding of the stator, wherein a heating device is provided, by means of which the winding and the stator core can be heated to a predetermined trickle temperature, and the heating device having at least one electromagnetic inductor which is arranged so as to be movable coaxially or axially parallel to the stator.

To solve the problem, it is provided in this impregnation device that at least one temperature sensor is arranged radially inside the stator core, by means of which sensor the temperature on the radial inner face of the stator core and/or the winding can be measured. By arranging the at least one temperature sensor radially inside the stator, its temperature can be measured much more precisely than in the region of its radial outer face, so that inductively heating up and keeping warm the stator can be controlled better than before.

The invention was therefore based on the knowledge that the temperature on the radial inner face of the stator can advantageously be measured with temperature sensors attached directly there or in its immediate vicinity.

According to a preferred further development of the impregnation device according to the invention, it is provided that the at least one temperature sensor is arranged on the drive shaft, by means of which sensor the temperature on the radial inner face of the stator core and/or the winding can be measured. The drive shaft provides sufficient installation space for the arrangement of the at least one temperature sensor. In addition, this drive shaft, equipped with the at least one temperature sensor, is pushed axially into the relevant stator in order to grasp and hold it and is later removed again together with the temperature sensor attached thereto. Thus, one or more of the temperature sensors need not be attached to the radial inner peripheral surface of each individual stator to be impregnated.

It is particularly advantageous if a temperature sensor in the region of the axial center of the stator and in each case a temperature sensor in the region of the axial end of the stator or the winding heads formed there are arranged on the drive shaft. By means of these three temperature sensors, an axial heating profile can be determined, which allows a control device to recognize at which axial regions of the stator its heating needs to be intensified at the expense of other axial regions. For this purpose, the control device will vary the axial back and forth movement of the inductor and/or the current intensity passed through it in order to achieve uniform and rapid heating of the stator.

According to an alternative embodiment to this, it can be provided that the at least one holding device arranged on the drive shaft has at least two radially spreadable arms, and that at the radial outer end of at least one of these arms a temperature sensor is arranged which, when the arms are completely radially spread, makes touch contact with the radial inner face of the stator core or the winding. A particularly precise measurement of the temperature of the stator or of the stator core on its inner peripheral surface can be achieved through this touch contact of the temperature sensor.

In addition to the temperature measurement on the radial inner face of the stator, it can be useful for at least one temperature sensor to also be arranged on the radial outer face of the stator, the measured values of which can advantageously be used to control the axial movement and the electrical current conducted through the inductor.

With regard to the relevant temperature sensors, it is preferably provided that they are integrally connected to electronics which have an electromagnetic transmitter by means of which the measured values of the temperature sensor can be transmitted wirelessly as transmission signals to a receiving device outside the stator. This advantageously avoids supplying the temperature sensors, their electronics and transmitters with electrical power via electrical lines and sliding contacts on the drive shaft and/or on the stator.

In a further development of this embodiment, it is provided that the receiving device for the transmitted signals has or is connected to electronics which are connected to a control device by signal technology, that this control device is connected to the at least one electromagnetic inductor of the heating device for its power supply, and in which case the control device can generate an electrical current and conduct it to the at least one electromagnetic inductor, the current intensity of which depends on the temperature measured by the at least one temperature sensor.

Finally, it is preferably provided that the at least one temperature sensor and its electronics as well as a transmitter are designed to be energy self-sufficient as a sensor unit, a coil being present in each case in the sensor unit, in which coil an electrical voltage can be induced by the at least one inductor that is moved past, for coupling power into this sensor unit. Accordingly, the power necessary for the operation of this sensor unit is obtained by means of electromagnetic coupling into the sensor unit.

BRIEF DESCRIPTION OF THE DRAWINGS

For a better understanding of the invention, a drawing is attached in which an embodiment is shown. In this drawing, the single FIGURE shows a schematic representation of an impregnation device having the features of the invention, in which representation a stator is shown in a schematic central longitudinal section, which stator is coaxially surrounded by an electromagnetic inductor.

DETAILED DESCRIPTION

Accordingly, the FIGURE shows an impregnation device 1 for a hollow cylindrical stator 2. The stator 2 to be treated in the impregnation device 1 is, after its final completion, a component of an electric machine, for example an electric motor or a generator. The stator 2 has, for example, a conventional structure with annularly arranged stator segments, each of these stator segments having a frame to which lamination plates arranged one behind the other are fastened. The frame and the stator lamination plates together form a stator core 3. Stator windings 4 made up of wires or conductor bars are arranged between adjacent stator segments, the line ends of which are routed out of the stator core 3 in the region of a winding head 5 on the axial end. In addition, insulation material (not shown) is arranged in the stator 2, by means of which insulation material, components to be electrically separated from one another are spaced apart from one another.

The stator 2 is accommodated in the impregnation device 1 recognizably inclined with respect to its geometrical longitudinal axis at an angle of inclination with respect to horizontal, where this angle of inclination can be between 0° and 20°, for example.

The stator 2 is rotatably mounted in the impregnation device 1 and is rotatable about its longitudinal axis by an electric drive motor 6 according to the rotational direction arrow 33. For this purpose, the motor shaft of the drive motor 6 is connected to a drive shaft 7 via a device (not shown). This drive shaft 7 carries two holding devices 8, 9 that are axially spaced apart from one another, each with three or four arms 10, 11, 12 that can be spread out radially outwardly and retracted radially inwardly. The double arrows 34 illustrate the spreading directions of the arms. The arms 10, 11, 12 each have a contact element 13 radially on the outside, which can be pressed against the radial inner peripheral surface of the stator core 3 after the drive shaft 7 has been axially inserted into the cylindrical cavity of the stator 2. As a result, the stator 2 is held and axially fixed by means of the drive shaft 7, and it can be set in rotary motion about its longitudinal axis by means of this drive shaft 7 and the drive motor 6.

The drive motor 6 is connected to a control device 27 of the impregnation device 1 via a control line 39. This control device 27 controls the drive motor 6 with regard to its speed and in some cases supplies it with electrical power.

The stator 2 is surrounded annularly over a comparatively short axial section by an inductor 14 serving as a heating device 36, which inductor is designed as an electrical coil. The inductor 6 consists of a helically bent tube through which a coolant can be conducted. The inductor 14 can, however, also be a sheet material and, for example, have a largely flat-bar-shaped cross-sectional geometry. In the embodiment shown in the FIGURE, it can clearly be seen that the axial length of the inductor 14 is shorter than the axial length of the stator 2.

The inductor 14 is connected via two electrical lines 28, 29 to a voltage source operating as a frequency converter, which is contained in the control device 27 and can generate an alternating voltage of the desired frequency. When the inductor 14 is in operation, an alternating current flows through it and in the process generates an alternating magnetic field which generates eddy currents in all electrically conductive components of the stator 2 which simultaneously heat these components. Adjacent, electrically insulating materials of the stator 2 are also heated up by thermal radiation or thermal conduction.

The inductor 14 is arranged such that it can be displaced coaxially to the stator 2 by means of an actuator 37. In order to control the actuator 37, it is connected to the control device 27 via a control line 40. By means of the actuator 37, the inductor 14 can be moved back and forth between a first axial end position and a second axial end position. These directions of movement of the inductor 14 are illustrated by a double arrow 15.

Because the inductor 14 has a shorter axial length than the stator 2 and is moved back and forth between the two axial end positions by the actuator 37, a largely uniform heating of all components of the stator 2 can be achieved. When the inductor 14 has left this location in the direction of the second axial end portion after a heat treatment of the first axial end portion of the stator 2, the heat present in the interior thereof at the first end portion of the stator 2 can be passed on to all the components there, so that also electrically non-conductive components of the stator 2 are heated comparatively evenly together with the electrically conductive components. This also prevents the metal components of the stator 2, for example, from heating up too quickly and too much, as a consequence of which non-metal components of the stator 2, such as materials for electrical insulation, would be damaged. The same thing also happens at the second axial end portion of the stator 2 and in the region thereof arranged axially between them.

As the single FIGURE further shows, the impregnating device 1 also includes a trickle device 35 with a container 16 for a synthetic resin 19 which is liquid at room temperature. A pump 17 pumps the synthetic resin 19 through a line to a trickle nozzle 18, via which the synthetic resin 19 reaches the winding head 5 of the stator 2 with a comparatively low volume flow. The volume flow delivered by the pump 17 is large enough that just as much of the synthetic resin 19 reaches the winding head 5 as can be absorbed by the stator 2 to fill its winding-related cavities. During the curing of the synthetic resin 19 at an elevated temperature, the synthetic resin 19 solidifies to form a thermoset.

According to the invention, this impregnation device 1 also has a plurality of temperature sensors, some of which are shown as alternatives to one another in the FIGURE. All but one of the temperature sensors have in common that they are arranged radially inside the stator 2 on the drive shaft 7 or on the arms 10, 11, 12 of their holding devices 8, 9. An exception is a temperature sensor 38, which is arranged on the radial outer face of the stator 2 and additionally measures the outside temperature of the stator. This temperature sensor 38, which is arranged radially on the outside, can, however, be dispensed with if necessary.

As the FIGURE shows, according to a first embodiment, a total of five temperature sensors 20, 21, 22, 23, 24 are attached to the outer surface of the drive shaft 7. The temperature-sensitive surface of the temperature sensors points towards the radial inner peripheral surface of the stator 2 or of the stator core 4. According to an alternative variant to this, two temperature sensors 25, 26 are arranged on the radial outer end of one of the arms 12 of the two holding devices 8, 9. At this radial outer end of the arms 12 of the two holding devices 8, 9, these have the aforementioned contact elements 13, which are specially designed for damage-free application to the inner peripheral surface of the stator 2 or stator core 3. The two temperature sensors 25, 26 are attached to these contact elements 13, so that they have physical contact with the stator 2 or its winding 5.

All temperature sensors 20, 21, 22, 23, 24; 25, 26; 38 used in this impregnation device 1 are each structurally, preferably integrally, combined with sensor electronics (not shown separately) and an electromagnetic transmitter in a sensor unit 41. The temperature value measured by the relevant temperature sensor is preprocessed by the assigned sensor electronics and transmitted to the relevant transmitter of the sensor unit 41. The respective transmitters then transmit this temperature information as electromagnetic transmission signals 31 to a receiving device 30, which converts the electromagnetically received temperature measurement values into digital values in its electronics 32 and forwards them to the control device 27 in an orderly manner. The control device 27 then uses these measured temperature values, depending on their value and their axial distribution on the stator 2, to control the actuator 37 for a targeted axial movement of the inductor 14, as well as to generate an inductor current that is appropriate for the fastest and most uniform temperature distribution possible on the stator 2.

A special feature of the impregnation device 1 described here is that the power supply of the sensor units 41, that is to say the temperature sensor, the electronics there and the transmitter there, is performed by means of electromagnetic coupling. For this purpose, the sensor units 41 each have a coil in which an electrical voltage can be induced by the at least one inductor 14 that is moved past. The power thus coupled into the relevant sensor unit 41 is either used directly for measuring and transmitting operations or, if required, is temporarily stored in a small electric battery, which can also be part of the relevant sensor unit 41.

The invention claimed is:

1. An impregnation device for trickle impregnation of a stator of an electric machine with a synthetic resin which cures under an increase in temperature, the stator having a hollow cylindrical stator core and at least one winding, a drive shaft being arranged coaxially inside the stator and being drivable by a drive motor, at least one holding device being arranged on the drive shaft, by means of which holding device the stator can be detachably connected to the drive shaft, wherein a trickle device is provided, by means of which the synthetic resin can be directed onto at least one axial end of the winding of the stator, wherein a heating device is provided, by means of which the winding and the stator core can be heated to a predetermined trickle temperature, and the heating device having at least one electromagnetic inductor which is arranged so as to be movable coaxially or axially parallel to the stator, characterized in that at least one temperature sensor is arranged radially inside the stator core, by means of which temperature sensor the temperature on a radial inner face of the stator core and/or the winding can be measured, wherein a temperature sensor in a region of the axial center of the stator and in each case a temperature sensor in a region of the axial end of the stator or a winding head formed there is arranged on the drive shaft.

2. The impregnation device according to claim 1, characterized in that the at least one temperature sensor is arranged on the drive shaft, by means of which temperature sensor the temperature on the radial inner face of the stator core and/or the winding can be measured.

3. The impregnation device according to claim 1, characterized in that the at least one holding device arranged on the drive shaft has at least two radially spreadable arms, and in that a temperature sensor is arranged at a radial outer end of at least one of these arms which, when the arms are fully spread, has physical contact with the radial inner face of the stator core or of the winding.

4. The impregnation device according to claim 1, characterized in that at least one temperature sensor is additionally arranged on a radial outer face of the stator.

5. The impregnation device according to claim 1, characterized in that at least one of the at least one temperature sensors is integrally connected to electronics and an electromagnetic transmitter, by means of which transmitter the measured values of the at least one temperature sensor can be transmitted wirelessly as transmission signals to a receiving device outside the stator.

6. The impregnation device according to claim 5, characterized in that the receiving device has or is connected to electronics which are signal-connected to a control device, and that the control device with the at least one electromagnetic inductor of the heating device is connected to its power supply, the control device being able to generate such an electrical current having a current intensity and conduct it to the at least one inductor, the current intensity of which depends on the temperature measured by the at least one temperature sensor.

7. The impregnation device according to claim 1, characterized in that the at least one temperature sensor and its electronics and transmitter are designed to be energy-self-sufficient as a sensor unit, a coil being present in each case in the sensor unit for coupling power into this sensor unit, in which sensor unit an electrical voltage can be induced by the at least one inductor that is moved past.

* * * * *